United States Patent [19]

Alling et al.

[11] Patent Number: 4,677,720

[45] Date of Patent: Jul. 7, 1987

[54] METHOD FOR MAKING A DOUBLE ROW ROLLER BEARING RETAINER

[75] Inventors: Richard L. Alling; Richard W. Shepard, both of Torrington, Conn.; Clyde L. Landrum, Granger, Ind.; Robert H. Tofield, Torrington; Stephen T. Podhajecki, Norfolk, both of Conn.

[73] Assignee: The Torrington Company, Torrington, Conn.

[21] Appl. No.: 848,635

[22] Filed: Apr. 7, 1986

Related U.S. Application Data

[60] Division of Ser. No. 754,680, Jul. 12, 1985, Pat. No. 4,605,322, which is a continuation of Ser. No. 556,559, Nov. 11, 1983, abandoned.

[51] Int. Cl.[4] .......................... B21D 53/12; B21H 1/12; B21K 1/04; B21K 1/05

[52] U.S. Cl. ................. 29/148.4 C; 29/412; 29/417

[58] Field of Search ............... 29/148.4 C, 412, 417; 384/572, 575, 576, 577, 578, 579, 623

[56] References Cited

U.S. PATENT DOCUMENTS

| | | | |
|---|---|---|---|
| 1,966,775 | 7/1934 | Weis | 384/578 |
| 2,729,520 | 1/1956 | Ritchie et al. | 384/577 |
| 3,797,083 | 3/1974 | Schaeffler et al. | 29/148.4 C |
| 4,280,743 | 7/1981 | Fernlund | 384/572 X |
| 4,522,516 | 6/1985 | Neese | 384/572 |

Primary Examiner—Howard N. Goldberg
Assistant Examiner—Ronald S. Wallace
Attorney, Agent, or Firm—F. S. Troidl

[57] ABSTRACT

A single retainer retains two sets of circumferentially separated rollers. The retainer is made from flat metal stock. A method for making a double row retainer bearing from strip stock is disclosed.

3 Claims, 18 Drawing Figures

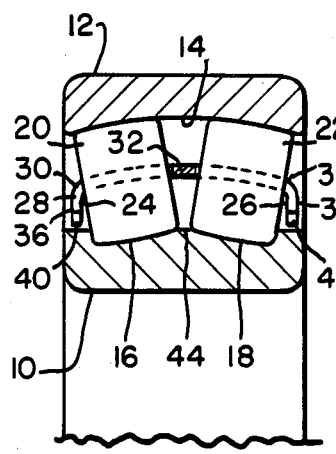
FIG. 1
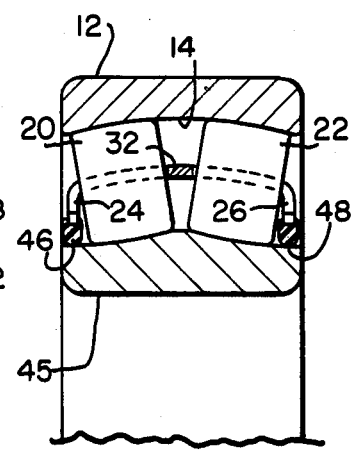
FIG. 2
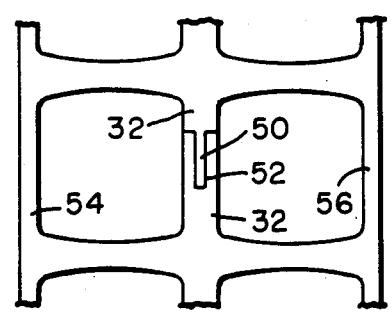
FIG. 3
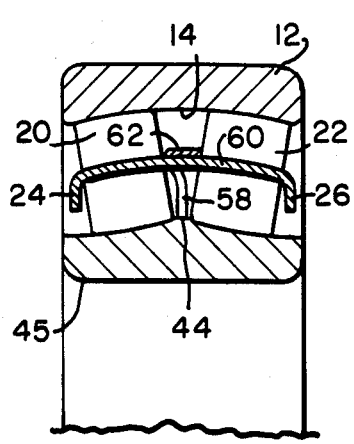
FIG. 7
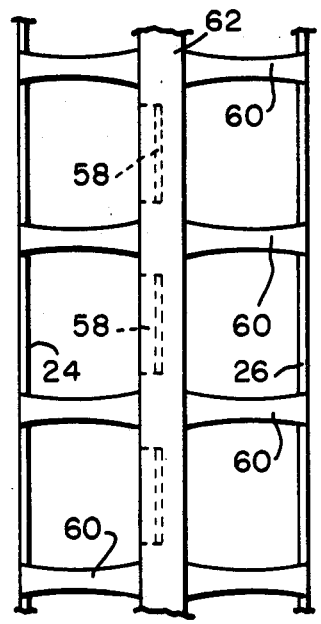
FIG. 8
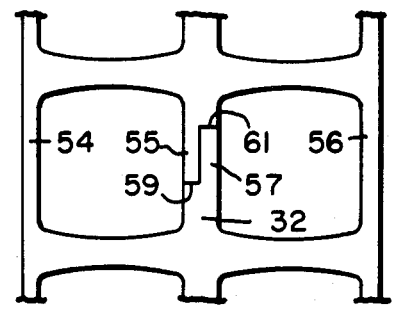
FIG. 4
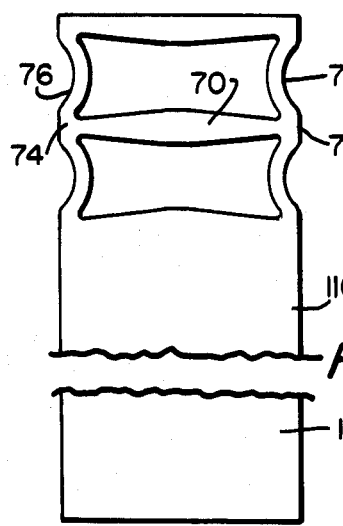
FIG. 9
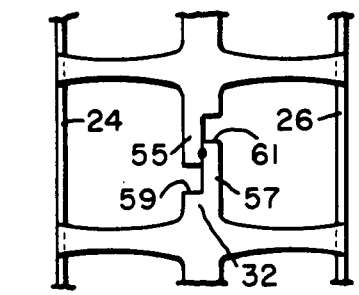
FIG. 5
FIG. 6

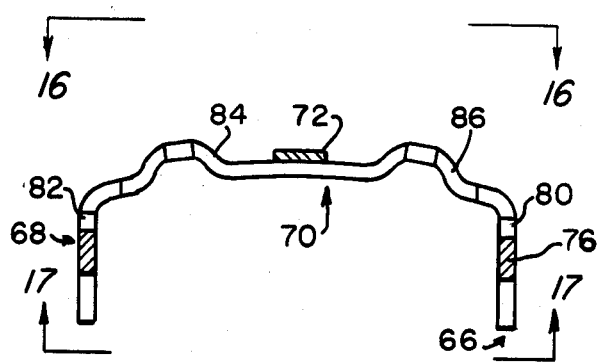
FIG. 15
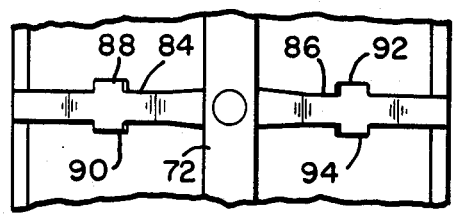
FIG. 16
FIG. 17
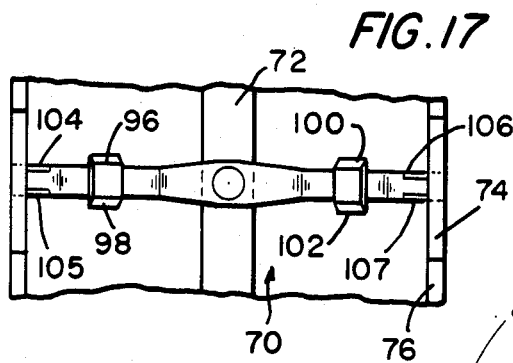
FIG. 18
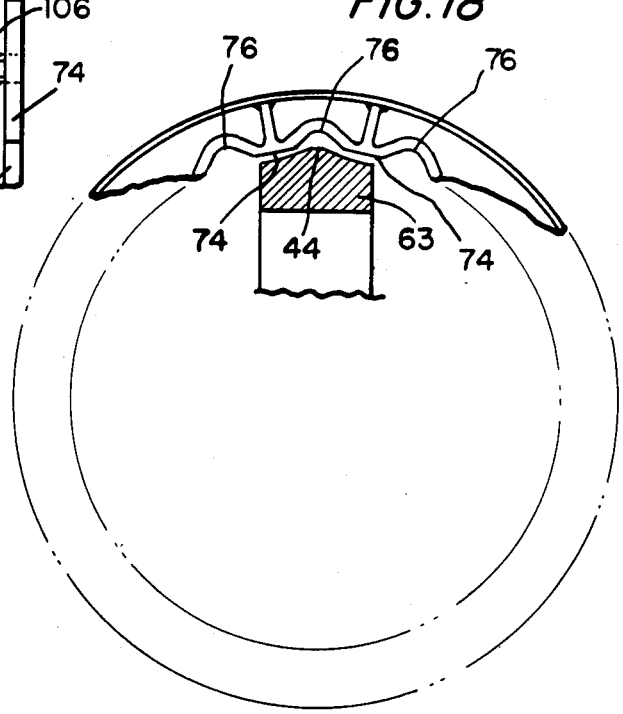

METHOD FOR MAKING A DOUBLE ROW ROLLER BEARING RETAINER

This is a division of application Ser. No. 764,680 filed July 12, 1985, now U.S. Pat. No. 4,605,322 issued Aug. 12, 1986, which is a continuation of application Ser. No. 556,559 filed Nov. 11, 1983, now abandoned.

This invention relates to double row roller bearings. More particularly this invention is one piece double row roller bearing retainer made from flat metal stock.

Currently available double row roller bearings, which have a metal retainer assembly, require two separate retainers to retain and guide the rollers in the double row roller bearing. A separate metal retainer is required for each set of rollers. An example is the roller retainer for roller bearings shown in U.S. Pat. No. 2,805,108 granted to N. A. Palmgren on Sept. 3, 1957 and entitled "Roller Cages for Roller Bearing".

This invention is a double row roller bearing retainer which is made of metal but is made in a single piece to retain both sets of rollers in the retainer.

Briefly described, the new double row roller bearing retainer is made from flat metal stock. The retainer includes a pair of axially separated end rings interconnected by circumferentially separated axially extending cross-bars, and an axially centered ring. The axially centered ring may be an integral center ring or a separate metal band which has been attached to the cross-bars by methods such as welding.

Briefly described, the new method of making a double row roller bearing retainer from flat metal stock comprises the steps of making a plurality of pockets in a flat metal strip. If the completed bearing is to have an integral center ring, the dimensions of the pockets are such that an integral center bar is formed. The cross-bars formed by the making of the plurality of pockets is shaped for roller guidance and roller retention. The flat metal strip is then U-formed, that is, the edges of the strip are bent to provide a strip having a U-shaped cross-section. Thereafter, a predetermined length of the U-formed strip is cut off and wrapped into an annular retainer. The circumferential terminals of the end ring are then bonded together to form a complete retainer if the integral center bar was formed by the pockets. If not, a separate axially centered metal band is connected to the cross-bars.

The invention as well as its many advantages may be further understood by reference to the following detailed description and drawings in which:

FIG. 1 shows in cross section one-half of a preferred embodiment of the invention;

FIG. 2 shows in cross section one-half of a second preferred embodiment of the invention;

FIG. 3 is a top fragmentary view of a flat metal strip before it is U-formed and wrapped into a third preferred embodiment of the invention.

FIG. 4 is a top fragmentary view of the metal strip of FIG. 3 after it has been U-formed, wrapped, and welded;

FIG. 5 is a top fragmentary view of a flat metal strip condition before U-forming and wrapping of still another preferred embodiment of the invention;

FIG. 6 is a top fragmentary view of the metal strip of FIG. 5 after it has been U-formed, wrapped into an annular retainer, and welded;

FIG. 7 shows in cross-section one-half of another preferred embodiment of the invention utilizing a separate band which has been welded to the cross-bars of the retainer;

FIG. 8 is an enlarged top fragmentary view or the retainer of FIG. 7;

FIG. 9 illustrates one of the steps used to make a still further preferred embodiment from the flat strip metal material;

FIG. 15 is a sectional view taking along lines 15—15 of FIG. 14 in the direction of the arrows with the races and rollers removed;

Figure 10:
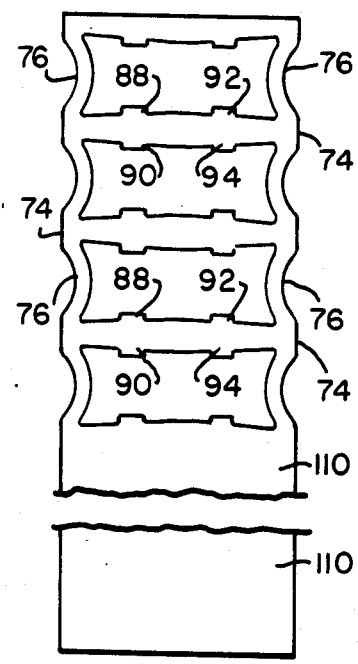
FIG. 10 is useful to illustrate a subsequent step.

FIG. 16 is a view taken along lines 16—16 of FIG. 15 and in the direction of the arrows; and FIG. 17 is a view taken along lines 17—17 of FIG. 15 and in the direction of the arrows; and FIG. 18 is a view showing the inner race turned 90 degrees out of phase with the retainer of FIG. 13 through FIG. 17 for assembly.

In the various figures, like parts are referred to by like numbers.

Referring to the drawings and more particularly to FIG. 1, this emobdiment includes an annular inner race 10 and an annular outer race 12. An inner curved surface 14 is formed on the inside of annular outer race 12. The inner race 10 has curved raceways 16 and 18 extending angularly toward the bearing axis and separated by annular protrusion 44. The spherical rollers 20 and 22 contact the raceways 16 and 18, respectively, and also contact the outer race surface 14. The axes of the rollers 20 and 22 are at an angle to the spherical roller bearing axis.

The retainer includes a pair of axially separated end rings 24 and 26 interconnected by a plurality of circumferentially separated axially extending cross-bars 30 (one cross-bar is shown in FIG. 1). An axially centered ring 32 forms an integral part of the retainer. A first set of circumferentially separated pockets 28 are formed by end ring 24, cross-bars 30, and the integral axially centered ring 32. A second set of circumferentially separated pockets 31 are formed by end ring 26, cross-bars 30, and the axially centered ring 32.

The cross-bars are generally U-shaped in cross-section and include the legs 36 and 38 extending radially outwardly from end rings 24 and 26, respectively, with the curved portion interconnecting the legs. The U-shaped cross-section provides pockets 28 and 31 each of which extend axially towards the end rings 24 and 26 of the retainer and radially inward. End rings 24 and 26 are piloted on annular flanges 40 and 42, respectively, of the inner race 10.

For assembly purposes, if the end rings 24 and 26 each have the same inside diameter throughout their entire circumference, the inner diameter of the end rings 24 and 26 must be equal to or greater than the outer diameter of the axially centered annular protrusion 44. The piloting of the end rings 24 and 26 is provided by the flanges 40 and 42, respectively, on the inner race 10.

In the embodiment of FIG. 2, the inner race 45 does not have any end flanges. To provide for the piloting of the end rings 24 and 26, non-metallic annuler rings 46 and 48 are inserted over the end rings 24 and 26, respectively. The non-metallic members 46 and 48 may be machined, molded, or made by the extrusion process and inserted by a "snap-fit" into the small diameters of the end rings 24 and 26.

The retainers shown in FIG. 1 and FIG. 2 are made from a flat metal strip. The retainers are made by piercing or otherwise making a plurality of pockets in the flat metal strip. The cross-bars thus formed are shaped for roller guidance and for roller retension. The flat metal strip is then U-formed to provide a strip having a U-shaped cross-section. A pre-determined length of the U-formed strip is then cut off, wrapped, and the end rings welded, or otherwise bonded together into the annular retainer shown in FIG. 1 or the annular retainer shown in FIG. 2. As the shaped flat piece is wrapped into an annular shape the center bar 32 is stretched and the end rings 24 and 26 are compressed. For certain size retainers, the required stretching of the center bar and the compression of the end rings may be such that it would be difficult to form the part from a flat metal material. One way of solving this problem is to make the embodiment of FIG. 3 and FIG. 4.

Referring to FIG. 3, which is a top fragmentary view of a flat metal strip which has been pierced to form the pockets, the center bar 32 remains an integral part of the retainer but is sheared through to form the tongue and groove connection in which the tongue 50 at one circumferential terminal of the bar 32 engages a groove 52 formed in the other circumferential terminal of the bar 32. The tongue and groove connection allows the bar 32 to move freely in a circumferential direction as the retainer diameter is formed. As shown in FIG. 4, once the retainer diameter is formed and the end rims 54 and 56 are formed into the end rings 24 and 26, the tongue 50 is resistance welded in groove 50 to make the center bar 32 one rigid member and to prevent the sheared portion from becoming distorted in application.

In the embodiment shown in FIG. 5 and FIG. 6, FIG. 5 is a fragmentary view of a flat strip before forming. The fingers 55 and 57 are formed by shearing the center bar 32. Each finger extends along a side of the other finger with finger 55 contacting surface 59 and finger 57 contacting surface 61. FIG. 6 shows the embodiment of FIG. 5 after the retainer diameter has been formed and the rims 54 and 56 turned inwardly to form end rings 24 and 26, respectively. Each finger 55 and 57 extends partially along the side of the other finger and are resistance welded to form a rigid central bar 32.

In the preferred embodiment of FIG. 7 and FIG. 8, the cross-bars 60 extend axially from one end ring 24 to the other end ring 26. In this embodiment, the center bar is not an integral part of the retainer; it is a separate metal band 62 which is connected to the cross-bars 60 by welding or other suitable bonding methods. The separate metal band 62 has a plurality of circumferentially separated radially inwardly extending projections 58. The projections 58 extend between the rollers 20 and 22 and reach in between the rollers 20 and 22 and serve to pilot the retainer on the protrusion 44 of the inner race 10. Note that the bottom of the projection 58 reaches the protrusion 44 of the inner race 10.

Figure 14:
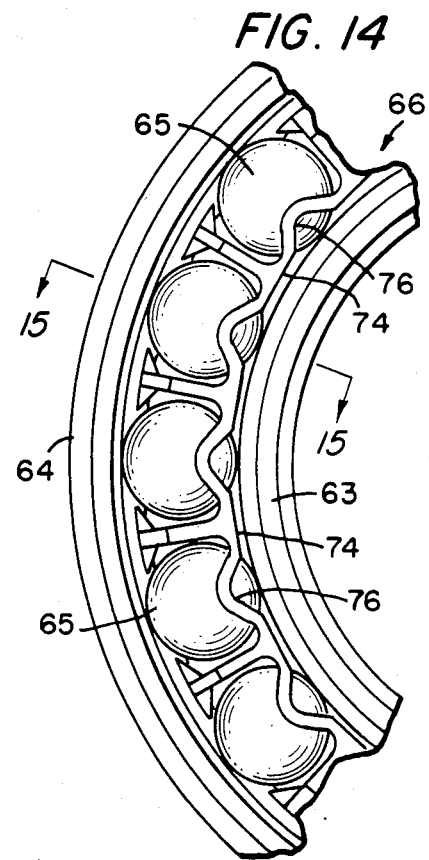
FIG. 14 is an enlarged fragmentary view of a bearing utilizing the retainer of FIG. 13.

FIGS. 14 through 18, inclusive, show still another preferred embodiment of the invention. Referring to FIG. 14 the retainer is located in the annulus separating the inner race 63 from the outer race 64. The retainer has pockets for guiding and retaining a first set of rollers 65. A second set of rollers (not shown) is located in the pockets aligned with the pockets guiding and retaining rollers 65.

As shown more clearly in FIGS. 15 through 17, the retainer includes a pair of axially separated end rings 66 and 68. Each cross-bar 70 extends from one end ring 66 to the other end ring 68. A separate metal band 72 is axially centered on the cross-bars 70. End ring 66 has alternate straight portions 74 and scallops 76 (see FIG. 14). End ring 68 has the same shape as end ring 66.

The inner race 63 has a cross-section (see FIG. 18) like the cross-section of the inner race 45 of FIG. 2 including the protrusion 44. The protrusion of inner race 63 has a larger outside diameter than the inside diameter of end rings 66 and 68. However, the rounded peaks of the scallops 76 have a larger diameter than the outside diameter of the inner race protrusion 44. Thus even though the inside diameter of the portions 74 of the retainers is less than the outside diameter of the protrusion of the inner race, the inner race may be inserted into the retainers simply by placing the inner race 63 with its axes perpendicular to the axis of the retainer, aligning the protrusion with two diametrically opposite scallops 76, pressing the inner race through said scallops into the retainer, and turning the inner race so the axis is the same as the axis of the retainer.

Looking at FIG. 15 it can be seen that the cross-bars 70 are each of a generally U-shape with the legs 80 and 82 extending radially outwardly from the straight portions 74 of end rings 66 and 68. Radially offset portions 84 and 86 are provided on the cross-bars 70 at points axially centered between the end ring 68 and the band 72, and the end ring 66 and the band 72, respectively. Referring to FIG. 16, circumferentially extending projections 88 and 90 extend from the offset portion 84. Circumferentially extending projections 92 and 94 extend from offset portion 86. Referring to FIG. 17, the sides 96, 98, 100, and 102 of projections 88, 90, 92, and 94, respectively, all taper radially inwardly. The rollers are guided circumferentially by those areas adjacent each side of the protrusions 88, 90, 92, and 94. The rollers are retained against falling radially outwardly by the tapered surfaces 96, 98, 100, and 102. The rollers are kept in place axially by the end rings 66 and 68 and the band 72. Coined depressions 104, 105, and coined depressions 106, 107 are provided near each end of each cross-bar. Thus when U-forming the retainer, as the flat metal stock is formed into the U-shape, the tension on the outside part of the cross-bar as it is being bent and the compression on the inside part of the cross-bar as it is being bent are minimized.

The method of making the double row roller bearing retainer of FIGS. 14 through 17, inclusive, is illustrated in FIGS. 9 through 13, inclusive. Referring to FIG. 9, the flat metal stock 110 has been pierced to form the pockets in the flat metal strip. The metal strip 110 also has had the scallops 76 formed on its side edges. Thereafter as shown in FIG. 10, the roller retaining projections 88, 90, 92 and 94 are formed on the metal strip.

Figure 11:
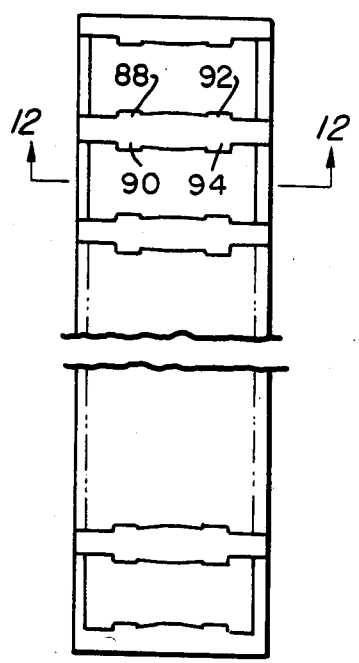
FIG. 11 is a view similar to FIG. 9 and FIG. 10 illustrating a subsequent step.
Figure 12:
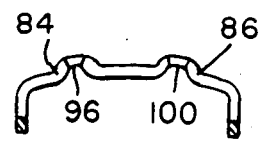
FIG. 12 is a view taken along lines 12—12 of FIG. 11 and in the direction of the arrows.

In FIG. 11 and FIG. 12, the metal strip 110 has been U-formed. As can be been by looking at FIG. 12, the cross-bars have been shaped to provide the radially offset portions 84 and 86 and the tapered portions such as 96 and 100 shown in FIG. 12.

Figure 13:
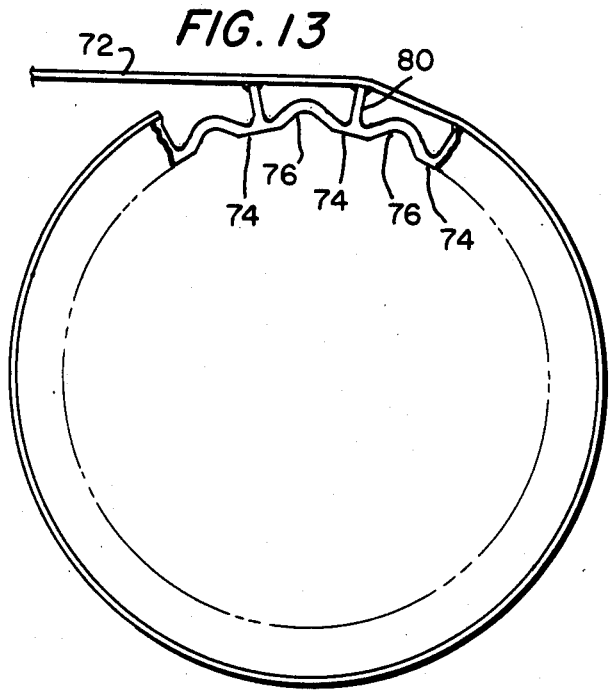
FIG. 13 shows the final step of wrapping the U-formed metal strip into an annular member and welding a separate band to the annular ember.

The final steps are the wrapping of the U-formed member into an annular shape as shown in FIG. 13 and welding or otherwise satisfactorily attaching the band 72 to the circumferentially separated cross-bars.

The axially centrally located separate bands, such as band 72, may be placed on the outside of the cross-bars or on the inside of the cross-bars or both. Also for added strength, the band may have overlapping sections.

The invention has been described and illustrated as a retainer, that is, the rollers retained against outside removal. However, the invention also includes cages, that is, the rollers are retained against both outside and inside removal, and separators, that is, the rollers ar separated but will fall out if the separator is removed from the bearing.

We claim:

1. A method of making a double row roller bearing retainer from flat metal stock comprising the steps of: making a plurality of pockets in a flat metal strip to provide pockets in the flat metal strip separated by cross-bars, and at the same time making scallops on each edge of the flat metal strip; shaping the cross-bars for roller guidance and for roller retention; U-forming the flat metal strip to provide a strip having a U-shaped cross-section; cutting off a predetermined length of the U-formed strip to provide a U-formed strip having two ends; wrapping the predetermined length into an annular retainer; and bonding the two ends together.

2. The method of claim 1 wherein: an axially centered band is wrapped around the retainer and bonded to the cross-bars.

3. The method of claim 1 wherein: the dimensions of the pockets made are such that a transversely centered integral bar is formed.

* * * * *